United States Patent
Stavely et al.

(10) Patent No.: US 7,502,064 B2
(45) Date of Patent: Mar. 10, 2009

(54) USING LIGHT PULSES TO IMPLEMENT AUTO-FOCUS IN A DIGITAL CAMERA

(75) Inventors: Donald J. Stavely, Windsor, CO (US); Mark J. Bianchi, Ft. Collins, CO (US); Daniel M. Bloom, Loveland, CO (US); Charles E. Schinner, Windsor, CO (US); Kurt Eugene Spears, Fort Collins, CO (US); Wilfred Brake, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 584 days.

(21) Appl. No.: 10/915,562

(22) Filed: Aug. 10, 2004

(65) Prior Publication Data

US 2006/0034598 A1 Feb. 16, 2006

(51) Int. Cl.
*G03B 13/00* (2006.01)
*G03B 17/00* (2006.01)
*H04N 5/232* (2006.01)
*G01C 3/08* (2006.01)

(52) U.S. Cl. .................... 348/348; 348/350; 396/80; 356/4.05; 356/5.07; 356/5.08

(58) Field of Classification Search ................. 348/345, 348/348, 350; 396/79–82, 138–139; 356/4.05, 356/4.1, 5.01, 5.02, 5.07, 5.08
See application file for complete search history.

(56) References Cited

U.S. PATENT DOCUMENTS

| 5,523,835 A | 6/1996 | Tanaka |
| 5,892,576 A * | 4/1999 | Gaechter .................... 356/5.05 |
| 5,933,187 A * | 8/1999 | Hirasawa et al. ........ 348/240.99 |
| 6,829,043 B2 * | 12/2004 | Lewis et al. ................. 356/5.06 |
| 2004/0135992 A1 * | 7/2004 | Munro ....................... 356/4.01 |

FOREIGN PATENT DOCUMENTS

| JP | 02228579 | 9/1990 |
| JP | 09297261 | 11/1997 |

* cited by examiner

*Primary Examiner*—Tuan V Ho
*Assistant Examiner*—Daniel M Pasiewicz

(57) ABSTRACT

A camera includes a light transmitter configured to transmit light pulses at a first rate, a light receiver configured to receive return signals corresponding to the light pulses transmitted by the light transmitter, and a sampler configured to sample electrical signals corresponding to the return signals received by the light receiver, wherein the sampler is configured to sample the electrical signals at a second rate that is lower than the first rate.

35 Claims, 6 Drawing Sheets

USING LIGHT PULSES TO IMPLEMENT AUTO-FOCUS IN A DIGITAL CAMERA

BACKGROUND

There are several different approaches for implementing auto-focus in a digital camera. According to a relatively simple and inexpensive approach, when a user presses a shutter button part-way down, the camera takes a series of exposures while moving the lens through a focus range. An auto-focus region at the center of the sensor is read out, and a focus metric (a value identifying the extent to which objects are in focus) is generated. Logic in the camera then identifies the focus metric corresponding to the best focus position for the camera lens. However, this technique is slow, since the lens must be stepped through a number of possible focus positions. As a result, there is a relatively long delay period (e.g., about one second) between the time that the shutter button is pressed and the time that a picture is taken.

Another approach for implementing auto-focus in a camera involves using an auto-focus module comprising optical elements such as prisms or beam-splitters, in addition to an array of light-sensing elements. This approach has the advantage of rapidly measuring a desired focus distance based on input from the optical elements. As a result, the camera lens may be moved only once, directly to the desired focus position. Such an approach, however, requires relatively expensive optical components.

Yet another approach determines a focus distance using ultrasonic pulses. For example, Polaroid developed a module that emits ultrasonic pulses and measures the delay of the corresponding return signals. A disadvantage of this approach, however, is that the required hardware is relatively bulky and expensive.

A further approach that may be used involves determining a focus distance using light pulses. For example, surveying equipment emits an infrared laser, receives a corresponding reflection via a photodiode detector, and then determines a distance to the target object based on the received reflection. Using a laser enables measuring long distances with a high degree of accuracy. This approach, however, requires receiving a narrow beam from a target object, and is not effective for a broad-beam, multiple-return path situation, as may be needed for photography.

SUMMARY

A camera and related methods are disclosed. An embodiment of a method for implementing auto-focus by a camera comprises transmitting light pulses at a first rate, receiving return signals corresponding to the transmitted light pulses, and sampling electrical signals corresponding to the return signals at a second rate that is lower than the first rate.

BRIEF DESCRIPTION OF THE DRAWINGS

Memory systems and related methods are illustrated by way of example and are not to be limited by the implementations illustrated in the following drawings. The components in the drawings are not necessarily to scale. Like reference numerals designate corresponding parts throughout the several views.

DETAILED DESCRIPTION

An embodiment of a method for implementing auto-focus includes transmitting light pulses at a pre-determined output rate and receiving the corresponding reflections. These reflections are then sampled at a sampling rate that is lower than the output rate. The sampled signals are then digitized and analyzed to determine a desired focus distance.

This method may, for example, be implemented by a camera that includes an infra-red (IR) light-emitting diode (LED) configured to emit IR light pulses, and a photodiode configured to receive reflections that correspond to the pulses. The LED is pulsed at a high rate, for instance from about 1 to 10 MHz. As is described below, the duration of each of the IR pulses may be narrow (e.g., between 1 and 10 ns) to enable a high level of accuracy.

A return signal from a single subject in the field of the emitter and detector is a pulse that is delayed by the travel time required for an IR pulse to reach the subject and then return to the photodiode. For example, for a subject that is 10 feet away from emitter and detector, this travel time is about 20 ns.

Figure 3:
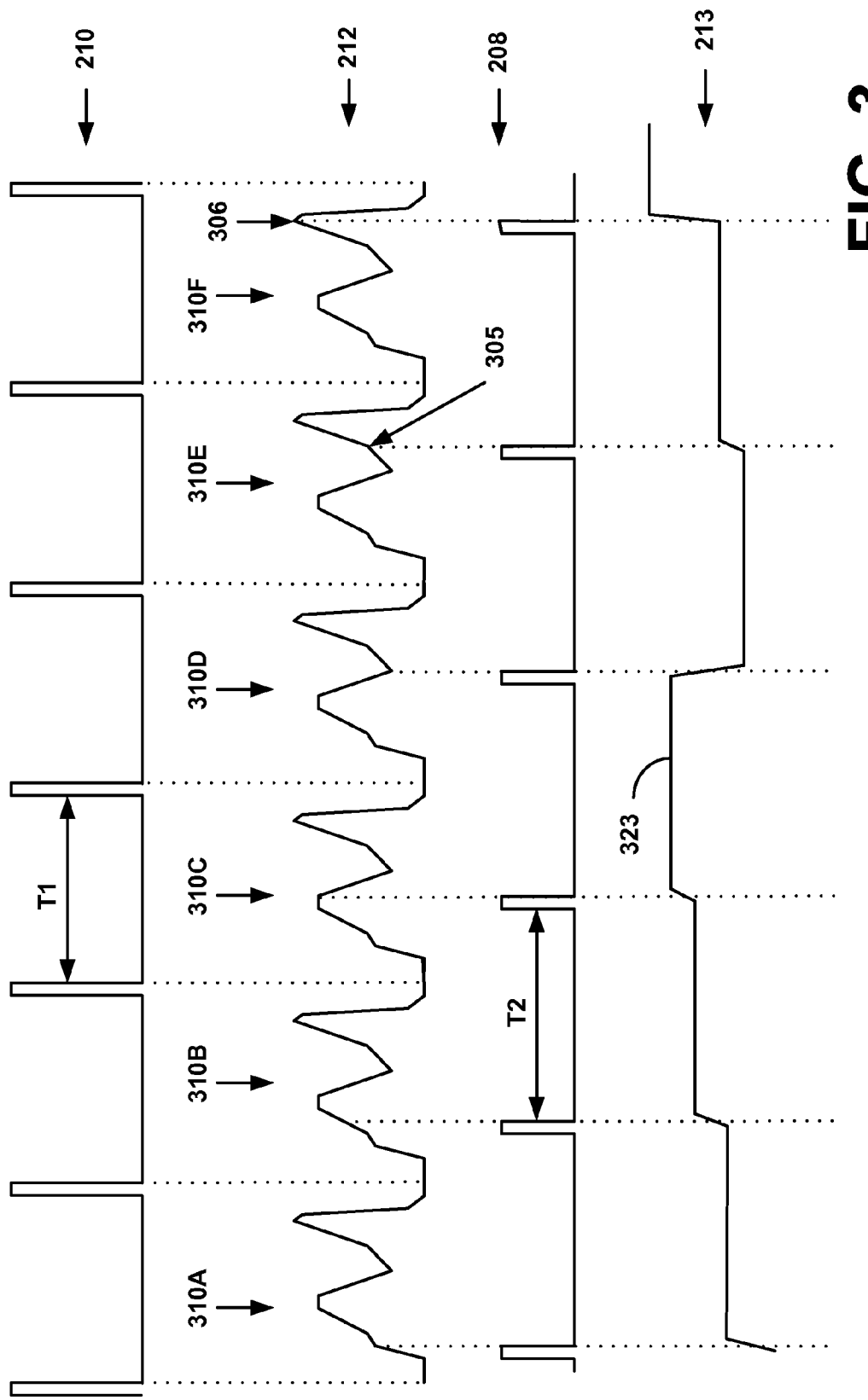
FIG. 3 is a diagram depicting representative signals in the light transceiver shown in FIG. 2 to implement auto-focus.

If there are several objects within the field of the emitter and detector, there will likely be several return signals from different distances. A composite signal that includes the multiple return signals may have a "video-like" appearance (e.g., as illustrated in FIG. 3). This video-like signal is then digitized and analyzed to identify a desired focus distance.

In most cases, the desired focus distance will correspond to the closest subject for which there is significant signal strength. An example of an algorithm for finding the focus distance would set a threshold level for the composite return signal, and then identify a signal level that exceeds the threshold and that corresponds to the quickest return time.

Since very fast A/D (analog to digital) conversion and storage of the composite return signal is needed, direct A/D conversion would be impractical. However, by repeating the pulses at a very high rate, the composite return signal is successively sampled over many pulse cycles and then digitized by an A/D converter. One advantage to this approach is that the composite return signal may be accurately digitized using a relatively slow A/D converter, instead of requiring a faster and more expensive converter. These and other embodiments will be discussed in more detail below in reference to the accompanying figures.

Figure 1:
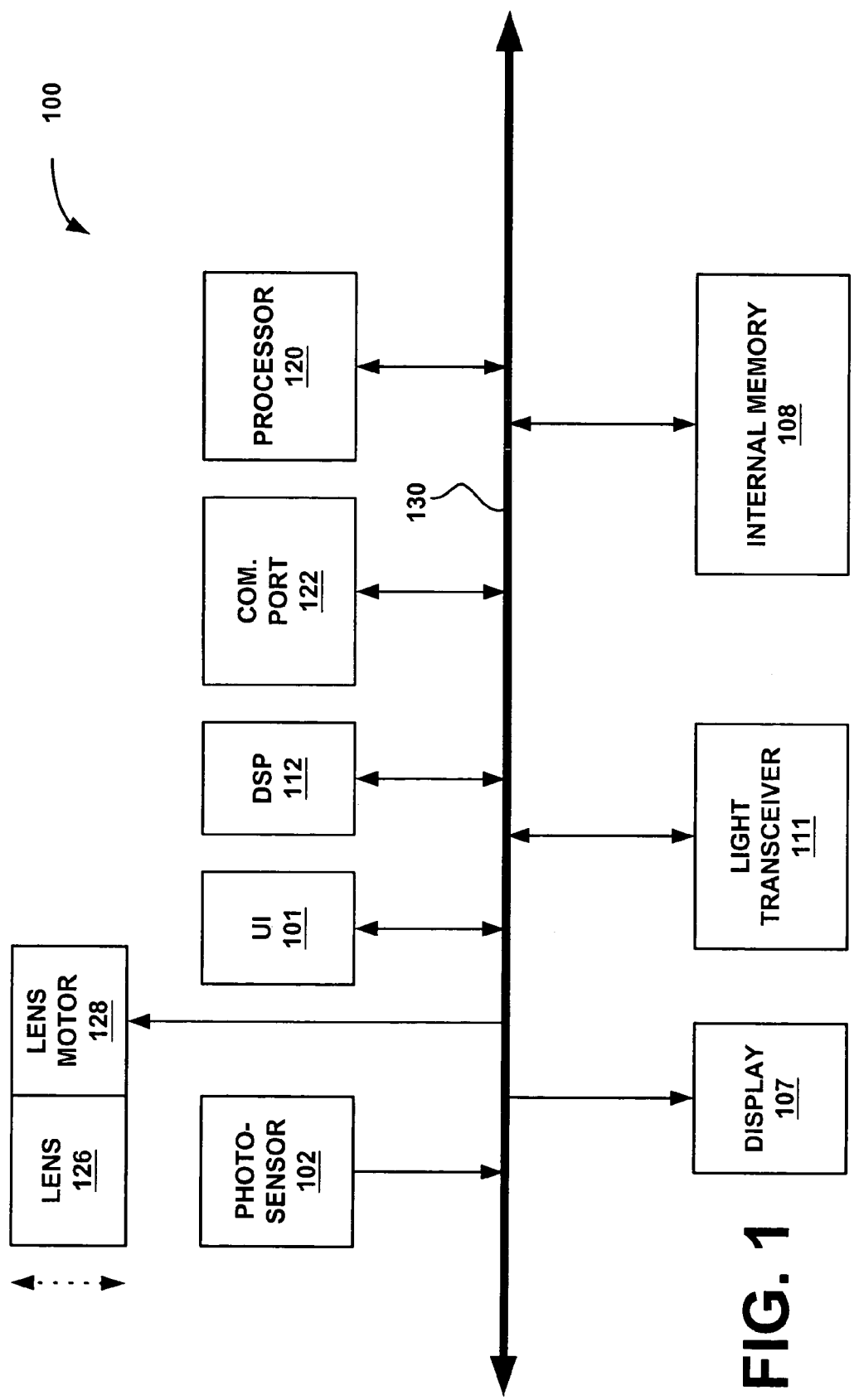
FIG. 1 is a block diagram depicting an example of components of a digital camera.

FIG. 1 is a block diagram depicting an example of components of a digital camera 100. The digital camera 100 includes a photo-sensor 102 for capturing images, a digital signal processor (DSP) 112 for manipulating images, a display screen 107 for displaying images, memory 108 for storing firmware and/or captured images, a processor 120 for executing firmware stored in the memory 108, user-input (UI) controls 101 for receiving user input, and one or more communication ports 122 for outputting image data to another device (e.g., a television or a computer).

The photo sensor 102 may comprise, for example, a charge coupled device (CCD) or a complementary metal oxide semiconductor (CMOS). The UI controls 101 may include physical controls such as, for example, buttons, rocker switches, and/or a key pad for receiving user input. Alternatively, the display screen 107 may be touch-sensitive, and may thus display virtual controls for receiving user input.

The memory 108, which may include a combination of volatile and non-volatile memory components, stores a graphical user interface (GUI) application and an auto-focus application (not shown). These applications may be executed by the processor 120, which may be a general-purpose or a custom-made processor configured to execute program code.

The processor 120 is programmed to enable focusing the camera lens 126 responsive to received reflections of light pulses emitted by the light transceiver 111. The camera lens 126 may be focused via a lens motor 128 that is responsive to the processor 120.

Each communication port 122 may comprise, for example, a serial port, a parallel port, a small computer system interface (SCSI), an infra-red (IR) interface, a wireless radio frequency (RF) interface, or a universal serial bus (USB) interface. The communication port 122 may be configured, for example, to enable the camera 100 to be coupled to a personal computer (PC) or a television.

The above-mentioned components of the digital camera 100 may be communicatively coupled via a local interface 130, which may comprise, for example, one or more buses or other wired or wireless connections. The local interface 130 may include additional elements, which are omitted for simplicity, such as, for example, controllers, buffers, drivers, repeaters, and/or receivers, to enable data transfer and communications between components of the digital camera 100.

Figure 2:
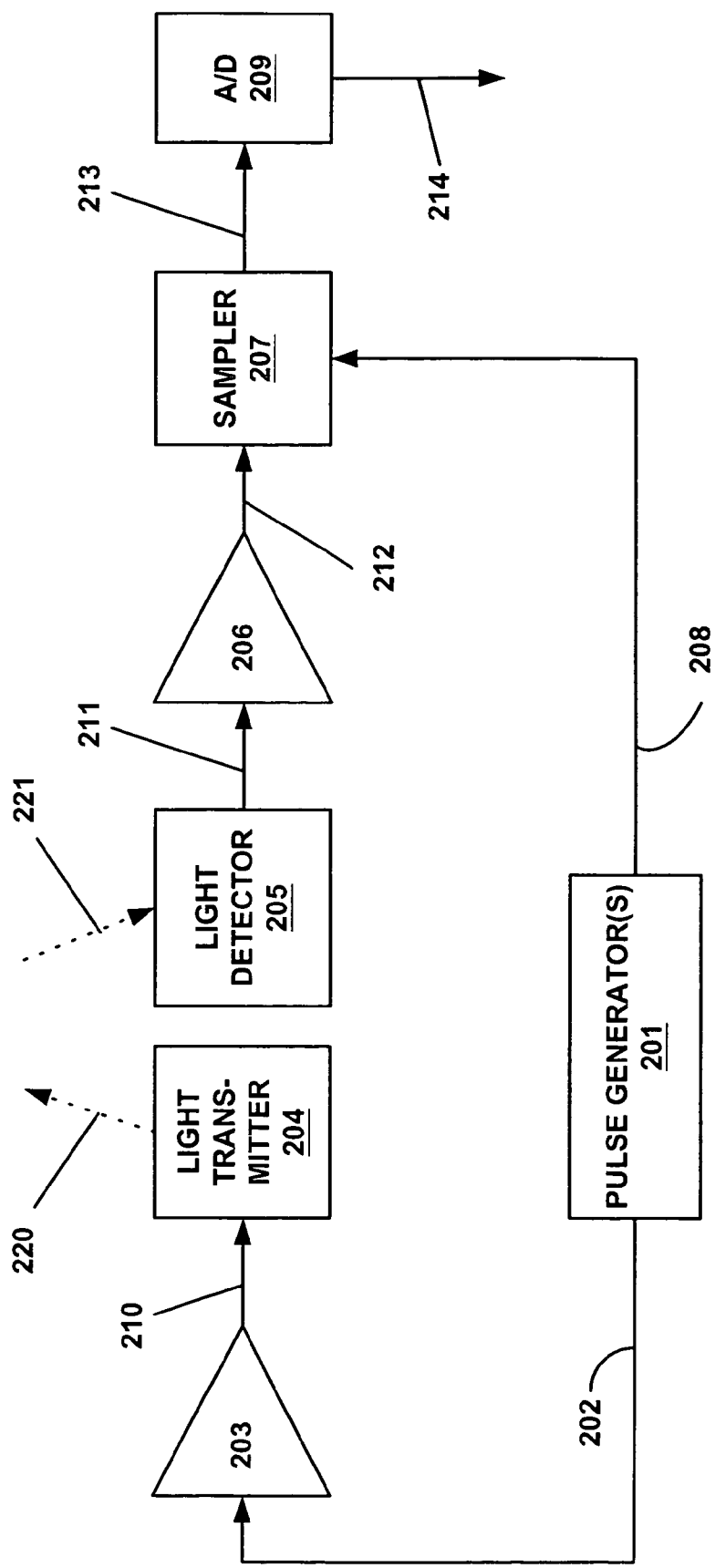
FIG. 2 is a block diagram depicting an embodiment of a light transceiver included in the digital camera shown in FIG. 1.

FIG. 2 is a block diagram of an embodiment of a light transceiver such as the light transceiver 111 shown in FIG. 1. The light transceiver 111 includes a pulse generator 201, a pulse driver 203, a light transmitter 204, a light detector 205, an amplifier 206, a sampler 207, and an A/D converter 209. The pulse generator 201 generates an output pulse 202 and a sampling pulse 208. The sampling pulse 208 has a lower frequency than the output pulse 202. Note that two separate pulse generators may alternatively be used to generate the output pulse 202 and the sampling pulse 208, respectively.

The pulse driver 203 uses the output pulse 202 to drive the light transmitter 204 via an amplified pulse 210. The light transmitter 204 (e.g., an infra-red light emitting diode ) emits a light pulse 220 having the same frequency as the output pulse 202. The light detector 205 (e.g., a photo-diode) detects reflections 221 corresponding to the light pulses 220, and provides corresponding reflection signals 211 to the amplifier 206.

The light detector 205 may be configured to detect a wide range of frequencies, whereas the light transmitter 204 may be configured to emit narrow wavelength pulses. Therefore, to limit interference from environmental IR sources, the light transceiver 111 may include a narrow bandpass filter (not shown) for filtering light. Such a bandpass filter would allow light waves having wavelengths corresponding to the pulse reflections 221 to pass-through to the light detector 205 while rejecting light waves having other wavelengths.

The amplifier 206 amplifies the reflection signals 211 received from the light detector 205 and provides amplified reflection signals 212 to the sampler 207. The sampler 207 samples the amplified reflection signals 212 received from the amplifier 206 at a sampling rate that corresponds to the sampling pulse 208. The sampler 207 provides sampled signals 213 to the A/D converter 209, which converts the sampled signals 213 into corresponding digital signals 214. The digital signals 214 may then be analyzed to determine a desired focus distance for a camera lens, as described further below.

The field of view of an auto-focus system depends on the width of the IR beams and on the detection range of the light detector 205, which is configured to detect the IR beams. In one embodiment, a single IR light transmitter 204 with a predetermined IR beam width is used to cover an auto-focus zone in the center of the camera field.

Other embodiments may include a plurality of IR light transmitters 204 configured to emit respective IR beams having either equal or varying widths. For example, a more focused IR beam can be used with a zoom lens in "tele-photo" mode in order to transmit light farther, and to target a narrower field. Furthermore, an array of IR transmitters 204 configured to emit IR beams having narrow beam widths may be used to enable "steerable" focus zones (e.g., where each focus zone is configured to cover a particular area of a scene, such as mid-left, mid-center, upper-right, etc.). According to yet another embodiment, narrower IR beams may be used to enable greater auto-focus accuracy for long-range objects while wider IR beams may be used to enable focusing on closer objects.

FIG. 3 is a diagram depicting signals used by the light transceiver 111 to implement auto-focus. The amplified reflection signal 212 includes a string of nearly identical waveforms 310A-310F. The sampling pulse 208 is used to sample the amplified reflection signal 212. The sampled signal 213 is a sampled version of the amplified reflection signal 212.

The sampling pulse 208 has a period T2 which is slightly longer than a period T1 corresponding to the amplified pulse 210. As a result, each of the waveforms 310A-310F is sampled at a location that is further along in time than the sampling location of a preceding waveform. For example, the location of sampling point 306 relative to waveform 310F is ahead of the location of sampling point 305 relative to waveform 310E by a time increment equal to the period T2 minus the period T1.

As an example, assume that the light pulse 220 is pulsed at a rate of 10 MHz (i.e., T1=100 ns), and has pulse widths of 1 ns. The amplified reflection signal 212 is then sampled with a sample window of 1 ns, and the sampled signal 213 is provided to an A/D converter 209 capable of 10 mega-samples per second. In this example, there are 100 sample positions for each waveform 310, with each sample window being 1 ns wide.

Continuing with this example, assume that the sampling pulse 208 has a rate of 9.9 MHz (i.e., T2=101 ns). As a result, each sample captured and converted will be delayed by 1 ns from the previous sample. Therefore, in order to digitize the equivalent of an entire waveform 310, 100 successive waveforms 310 are sampled over a period of ten microseconds. The calculated distance for an object in this example would have an accuracy of about 6 inches for objects that are less than 50 feet away.

More samples may be taken over a longer time period in order to provide a more robust and accurate conversion. For example, if the sampling pulse 208 has a rate of 9.99 MHz, then 1000 samples may be taken to digitize a waveform 310 over a time period of 100 microseconds. As another example, if the sampling pulse 208 has a rate of 9.999 MHz, then 10,000 samples may be taken to digitize a waveform 310 over a time period of one millisecond. Sampling at a higher rate reduces the effect of noise and spurious signals and enables a more accurate focus distance determination.

Figure 4:
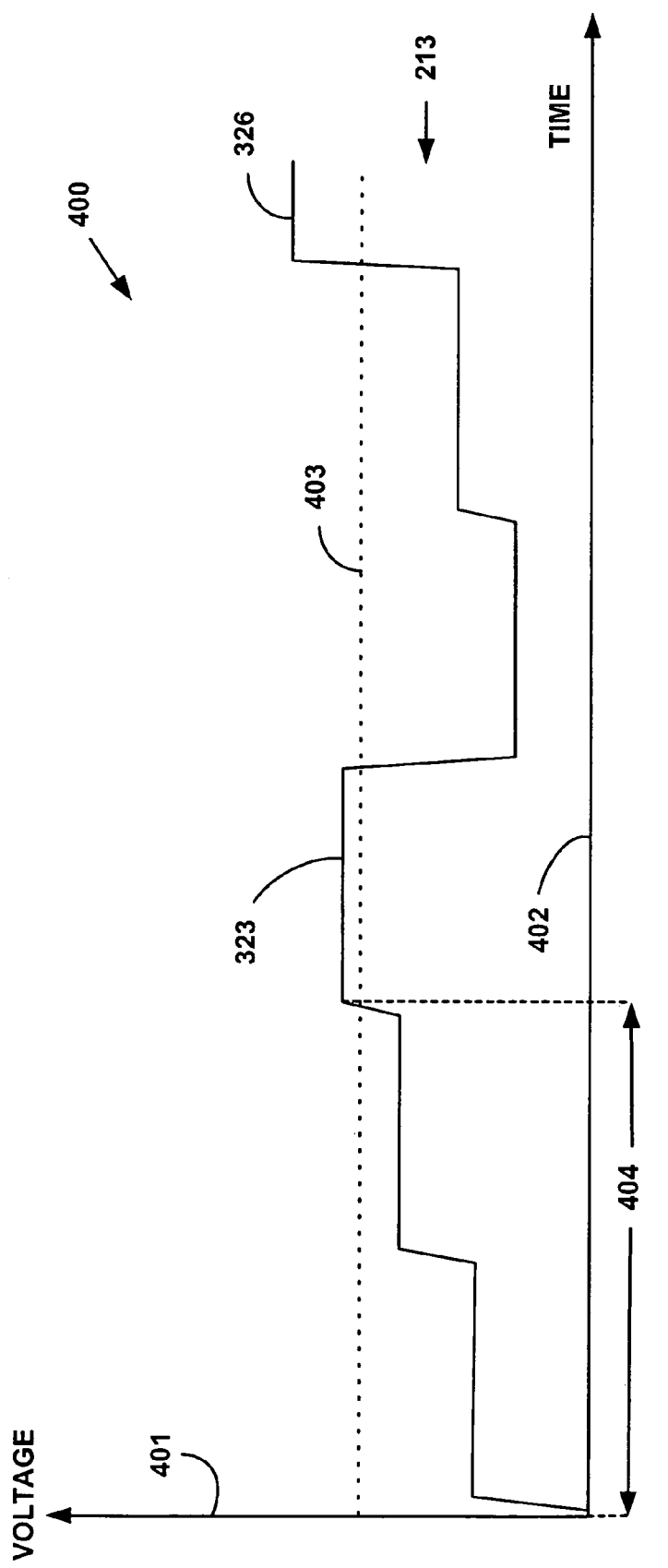
FIG. 4 depicts a graph illustrating how the sampled signal shown in FIG. 3 may be used to determine a focus distance.

FIG. 4 depicts a graph 400 illustrating the sampled signal 213. The graph 400 includes a voltage axis 401 and a time axis 402. A threshold 403 is set at a level that enables determining the time of flight corresponding to a likely target object on which the camera lens 126 will be focused.

In one approach for determining a focus distance, the distance corresponding to the first sampled level that exceeds the threshold 403 is determined. Following this approach, the sampled level 323 would be determined as being the first signal level that exceeds the threshold 403. Therefore, the time of flight 404 corresponding to the sampled level 323 may be used to calculate the focus distance. For example, the focus distance may be set equal to the distance between the camera 100 and an object corresponding to the sampled level 323. Such a distance may be calculated as follows:

$$d = t*c/2 \quad \text{[Equation 1]}$$

where d is the distance between the camera 100 and the target object, t is the corresponding time of flight 404, and c is the speed of light. In other words, the distance between the camera 100 and a target object is equal to half the distance traveled by a light pulse that is transmitted by the camera 100 and reflected off the target object back to the camera 100.

Other approaches for determining a focus distance may include, for example, taking into account multiple sampled levels that exceed one or more thresholds, or setting the focus distance to correspond to the highest sampled level or to a location that is between the two highest sampled levels.

Note that although the threshold 403 is shown as constant over time, the threshold 403 may alternatively vary over time (e.g., may be sloped) in order to better determine the distance to a desired target object. For example, if a user-modified camera setting indicates that the target object is likely to be relatively close to the camera, then an upward sloping threshold 403 may be used. Conversely, if a user-modified camera setting indicates that the target object is likely to be relatively far from the camera, then a downward sloping threshold 403 may be used.

Figure 5:
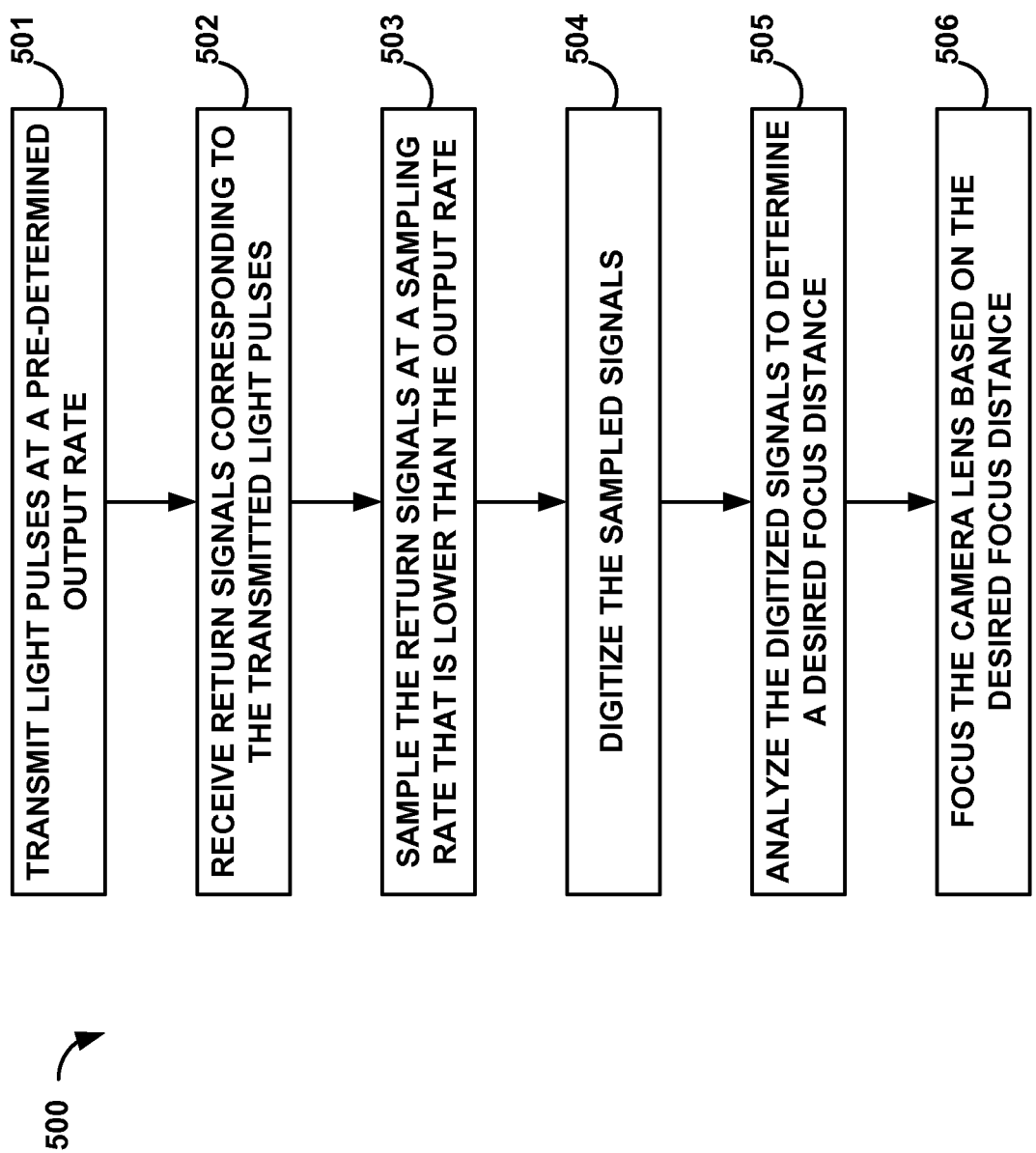
FIG. 5 is a flow chart depicting a method for implementing auto-focus in a digital camera such as the digital camera shown in FIG. 1.

FIG. 5 is a flow chart depicting a method 500 for implementing auto-focus in the digital camera 100 (FIG. 1). As indicated in step 501, light pulses are transmitted at a predetermined output rate. The light pulses may be transmitted via, for example, a light emitting diode (LED). Return signals corresponding to reflections of the transmitted light pulses are received as indicated in step 502. The return signals may be detected via, for example, a photo-diode.

The return signals are then sampled at a sampling rate that is lower than the output rate (at which the light pulses were transmitted in step 501), as indicated in step 503. Sampling the return signals at this lower rate enables reconstructing a digitized version of a repeating waveform in the return signals. The sampled signals are then digitized, as indicated in step 504.

These digitized signals are analyzed to determine a desired focus distance as indicated in step 505. One approach may be, for example, to set the focus distance to correspond to the closest object for which a sampled signal level exceeds a predetermined threshold. A camera lens is then focused based on the determined focus distance, as indicated in step 506.

Figure 6:
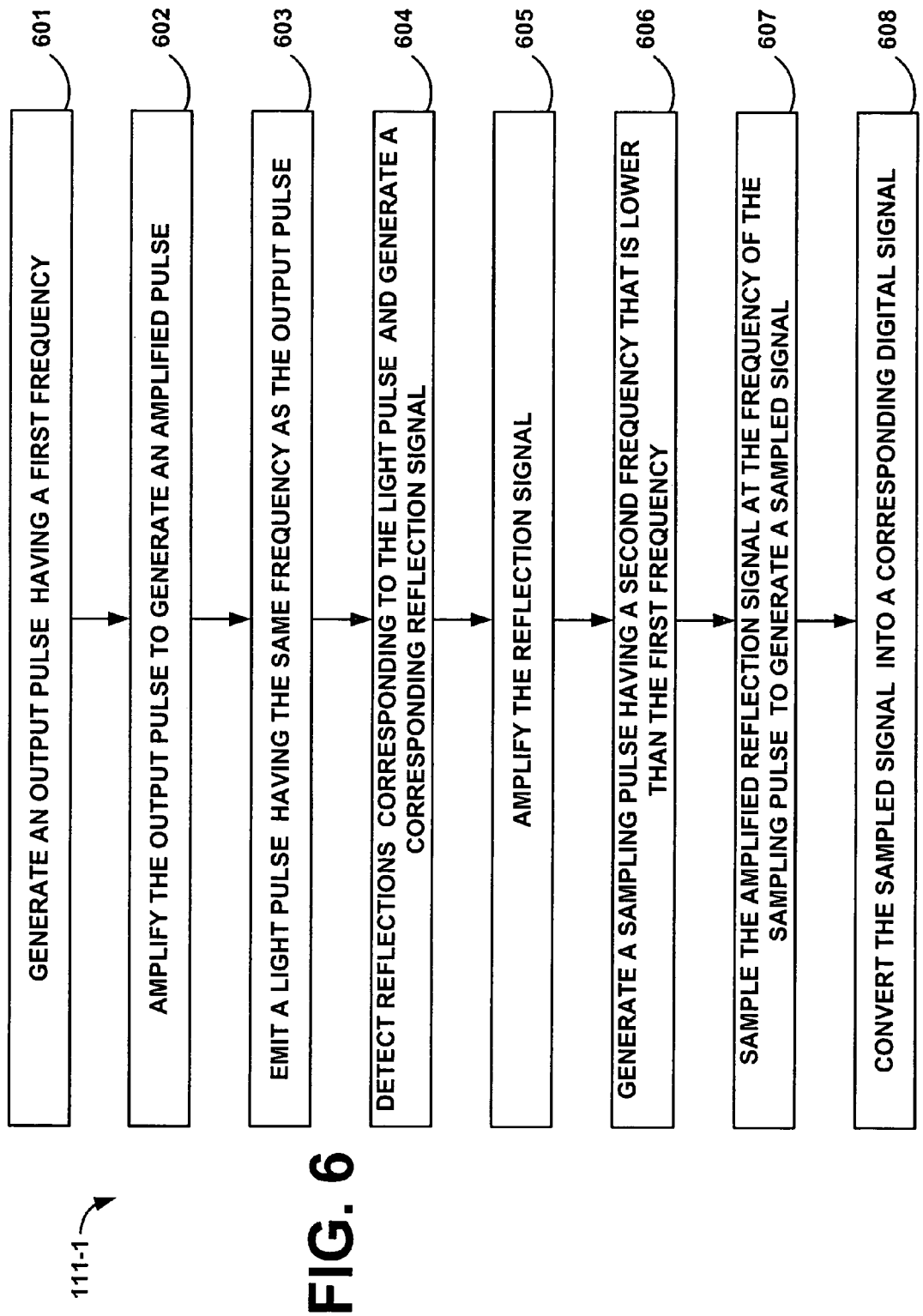
FIG. 6 is a flow chart depicting a method implemented by the light transceiver depicted in FIG. 2.

FIG. 6 is a flow chart depicting a method 111-1 implemented by the light transceiver 111 depicted in FIG. 2. An output pulse 202 (FIG. 2) having a first frequency is generated, as indicated in step 601. The output pulse 202 is amplified to generate an amplified pulse 210 (FIG. 2) as indicated in step 602. A light pulse 220 (FIG. 2) having the same frequency as the output pulse 202 is emitted, as indicated in step 603. The light pulse 220 may be an infra red (IR) light that is emitted via, for example, a light emitting diode (LED).

Reflections 221 (FIG. 2) corresponding to the light pulse 220 are detected and a corresponding reflection signal 211 (FIG. 2) is generated, as indicated in step 604. The reflections 221 may be detected via, for example, a photo-diode. The reflection signal 211 is amplified, as indicated in step 605. A sampling pulse 208 (FIG. 2) having a second frequency that is lower than the first frequency (i.e., lower than the frequency of the output pulse 202) is generated, as indicated in step 606. The sampling pulse 208 and the output pulse 202 may either be generated by the same pulse generator 201 (FIG. 2) or by respective pulse generators.

The amplified reflection signal 212 (FIG. 2) is sampled at a sampling rate that corresponds to the frequency of the sampling pulse 208 to generate a sampled signal 213 (FIG. 2), as indicated in step 607. The sampled signal 213 is converted into a corresponding digital signal 214 (FIG. 2), as indicated in step 608. This digital signal 214 may subsequently be used by the digital camera 100 (FIG. 1) to determine the focus distance of the camera lens 126 (FIG. 1). It should be emphasized that the above-described embodiments are examples of possible implementations. Other variations and modifications may be made to the above-described embodiments. All such modifications and variations are intended to be included herein within the scope of the disclosure.

The invention claimed is:

1. A method for implementing auto-focus by a camera comprising:
   transmitting light pulses at a first frequency;
   receiving return signals corresponding to the transmitted light pulses, the return signals reflected from objects from different distances;
   sampling electrical signals corresponding to the return signals at a second frequency that is lower than the first frequency;
   identifying a signal level from the sampled electrical signals that exceeds a threshold level and corresponds to a quickest return time, the quickest return time being a time for receiving the return signals from a closest subject for which there is significant signal strength; and
   effecting a setting of a camera lens focus distance based on a one of the sampled electrical signals corresponding to the identified signal level.

2. The method of claim 1, wherein the light pulses comprise infrared light.

3. The method of claim 1, further comprising:
   digitizing the sampled electrical signals;
   determining a focus distance responsive to the digitized electrical signals; and
   focusing a camera lens responsive to the determined focus distance.

4. The method of claim 1, wherein the light pulses are transmitted by a plurality of light transmitters.

5. The method of claim 1, wherein the light pulses are transmitted by a light transmitter that is responsive to electrical pulses received by the light transmitter from a pulse generator.

6. The method of claim 5, wherein the electrical pulses are amplified by a driver prior to being received by the light transmitter.

7. The method of claim 5, wherein the light transmitter comprises a light emitting diode (LED).

8. The method of claim 1, wherein the electrical signals are sampled by a sampler that is responsive to electrical pulses received by the sampler from a pulse generator.

9. The method of claim 8, wherein the electrical signals are amplified prior to being sampled by the sampler.

10. The method of claim 1, wherein the return signals are detected by a photo-diode configured to convert the return signals into the electrical signals.

11. A camera comprising:
    a light transmitter configured to transmit light pulses at a first frequency;
    a light receiver configured to receive return signals corresponding to the light pulses transmitted by the light transmitter, the return signals reflected from objects from different distances;
    a sampler configured to sample a plurality of electrical signals corresponding to the return signals received by the light receiver, wherein the sampler is configured to sample the plurality of electrical signals at a second frequency that is lower than the first frequency; and
    a processor configured to:
        identify a signal level from the plurality of sampled electrical signals that exceeds a threshold level and corresponds to a quickest return time, the quickest return time being a time for receiving the return signals from a closest subject and the threshold level corresponding to a predefined significant signal strength; and effect a setting of a camera lens focus distance based on a one of the plurality of sampled electrical signals corresponding to the identified signal level.

12. The camera of claim 11, wherein the light pulses and the corresponding return signals comprise infrared light.

13. The camera of claim 11, further comprising:
an analog to digital (A/D) converter configured to digitize the sampled electrical signals; and
wherein the processor configured is configured to determine the focus distance based on the digitized electrical signals.

14. The camera of claim 13, wherein the processor is configured to effect the setting by enabling a camera lens to be positioned at a focus location that is responsive to the determined focus distance.

15. The camera of claim 11, wherein the light transmitter is responsive to electrical pulses received by the light transmitter from a pulse generator, and wherein the electrical pulses are output by the pulse generator at the first frequency.

16. The camera of claim 15, wherein the electrical pulses are amplified by a driver prior to being received by the light transmitter.

17. The camera of claim 15, wherein the light transmitter comprises a light emitting diode (LED).

18. The camera of claim 11, wherein the sampler is responsive to electrical pulses received by the sampler from a pulse generator, wherein the electrical pulses are output by the pulse generator at the second frequency.

19. The camera of claim 18, wherein the electrical signals are amplified prior to being sampled by the sampler.

20. The camera of claim 11, wherein the light receiver comprises a photo-diode configured to convert the return signals into the electrical signals.

21. A system for implementing auto-focus, the system comprising:
means for receiving return signals corresponding to light pulses transmitted at a first frequency, the return signals reflected from objects from different distances;
means for sampling electrical signals corresponding to the return signals at a second frequency that is lower than the first frequency; and
means for identifying a signal level from the sampled electrical signals that exceeds a threshold level of a predefined significant signal strength and corresponds to a quickest return time for receiving the return signals from a closest subject; and
means for effecting a setting of a camera lens focus distance based on a one of the sampled electrical signals corresponding to the identified signal level.

22. The system of claim 21, wherein the light pulses comprise infrared light.

23. The system of claim 21, further comprising:
means for digitizing the sampled electrical signals; and
wherein the means for effecting further comprises means for determining the focus distance responsive to the digitized electrical signals.

24. The system of claim 23, further comprising:
means for focusing a camera lens responsive to the determined focus distance.

25. The system of claim 21, further comprising means for transmitting the light pulses.

26. The system of claim 25, further comprising means for driving the means for transmitting.

27. The system of claim 26, further comprising means for generating a pulse that is provided to the means for driving.

28. The system of claim 21, wherein the means for sampling is responsive to electrical pulses provided by a pulse generator.

29. The system of claim 28, further comprising means for amplifying the electrical pulses provided by the pulse generator.

30. The system of claim 21, wherein the means for receiving comprises a photo-diode.

31. A method for implementing auto-focus in a camera, comprising:
generating an output pulse having a first frequency;
amplifying the output pulse to genefrequency an amplified output pulse having the first frequency;
emitting a light pulse responsive to the amplified output pulse, the light pulse having a frequency that is substantially equal to the first frequency;
detecting reflections corresponding to the light pulse;
generating a composite reflection signal corresponding to the detected reflections, the detected reflections from objects from different distances;
amplifying the composite reflection signal;
generating a sampling pulse having a second frequency that is lower than the first frequency;
sampling the amplified composite reflection signal responsive to the sampling pulse at a frequency that is substantially equal to the frequency of the sampling pulse to genefrequency a sampled signal;
converting the sampled composite signal into a corresponding digital composite signal;
identifying a signal level from one of the signals of the digital composite signal that exceeds a threshold level of a predefined significant signal strength and corresponds to a quickest return time for receiving the return signals from a closest subject and the threshold level; and
effecting a setting of a camera lens focus distance based on a one of the signals of the digital composite signal corresponding to the identified signal level.

32. The method of claim 31, further comprising:
determining a focus position for a camera lens responsive to the digital composite signal.

33. A method for implementing auto-focus in a camera, comprising:
transmitting light pulses at a pre-determined output frequency and receiving the corresponding reflections, the light pulses repeating at a frequency sufficiently high to successively sample a composite return signal over many pulse cycles;
sampling the reflections at a sampling frequency that is lower than the output frequency, the reflection from a single subject in a field of an emitter and detector being a pulse delayed by travel time required for a pulse to reach a subject and then return to the detector;
digitizing and analyzing the sampled signals to determine a desired focus distance, the desired focus distance corresponding to the closest subject for which there is a significant signal strength.

34. The method of claim 33 wherein the light pulses are from an infra-red (IR) light-emitting diode (LED) configured to emit IR light pulses.

35. The method of claim 34 wherein the LED is pulsed at a high frequency from about 1 to 10 MHz and the duration of each of the IR pulses is narrow between about 1 and 10 ns to enable a high level of accuracy.

* * * * *